United States Patent [19]
Green et al.

[11] 3,832,543
[45] Aug. 27, 1974

[54] GATED DETECTOR SYNCHRONIZATION

[75] Inventors: Samuel I. Green, Creve Couer; Douglas W. Dreiserwerd, Florissant, both of Mo.

[73] Assignee: The United States of America as represented by the Secretary of the Air Force, Washington, D.C.

[22] Filed: June 4, 1973

[21] Appl. No.: 366,837

[52] U.S. Cl. ............................................. 250/199
[51] Int. Cl. ............................................. H04b 9/00
[58] Field of Search ............ 250/199; 313/103, 104; 329/144

[56] References Cited
UNITED STATES PATENTS
3,341,707    9/1967    Wingfield et al. .................. 250/199

*Primary Examiner*—Albert J. Mayer
*Attorney, Agent, or Firm*—Harry A. Herbert, Jr.; William Stephanishen

[57] ABSTRACT

An optical pulse detector apparatus providing remote synchronization of the frequency and phase of the R.F. gate drive signal to the modulated optical input pulse train.

3 Claims, 1 Drawing Figure

GATED DETECTOR SYNCHRONIZATION

BACKGROUND OF THE INVENTION

The present invention relates broadly a gated detector synchronization apparatus and in particular to a synchronized optical pulse detector.

The transmission of messages by light has been used by men since ancient time. However, the amount of information these light signals could carry, was limited by the weakness and noisiness of the available light source. An ordinary beam of light may be considered as a pure smooth carrier wave that has been modulated with noise by short bursts of light randomly emitted by the individual atoms in the light source. A laser can provide an almost ideally smooth wave containing only that which one puts on it. Therefore, by using a suitable means of modulation, coherent light waves are able to carry an enormous volume of information. This is so because the frequency of light is so high that even a very narrow band of the visible spectrum includes an enormous number of cycles per second. The amount of information that can be transmitted, therefore, is directly proportional to the number of cycles per second and therefore to the width of the band. Thus, it may be observed that the lasers will be particularly useful in communications systems. The development of laser communication systems requires that the receiver system have the capability to detect the intelligence which is contained in the laser beam. There then exists a requirement for an optical pulse detector to extract transmitted information.

SUMMARY

The present invention utilizes an optical pulse detector comprising an optical head in the form of a dynamic crossed field photo multiplier being driven by a 1200 MHz signal produced by an RF section. The dynamic crossed field photomultiplier is inherently a gated detector, and the gating is synchronous with the RF driving signal. A dithered gate phase discriminator is implemented in order to derive the phase information needed to align the gating with the received optical pulse train. The error signal from the dithered gate phase discriminator is used to control or phase lock the phase and frequency of the RF drive chain so that the gating is properly timed with respect to the received signal pulse train. Gate timing is dithered a small amount with respect to the received signal pulses by imposing a low deviation phase modulation on the 1200 MHz RF drive signal at the 1 MHz dither frequency. This results in small dither frequency amplitude and phase modulations of the output signal pulse train. These amplitude and phase modulations are synchronously detected by using the dither oscillator as a reference. The resultant error signal is used to phase-lock a voltage control oscillator that determines the RF drive phase and frequency.

It is one object of the invention, therefore, to provide an improved optical pulse detector apparatus utilizing a dynamic crossed field photomultiplier which is dithered by a 1200 MHz signal.

These and other advantages, objects and features of the invention will become more apparent from the following description taken in connection with the illustrative embodiments in the accompanying drawings, wherein the FIGURE is a block diagram of the optical pulse detector apparatus in accordance with this invention.

DESCRIPTION OF THE PREFERRED EMBODIMENT

Figure 1:
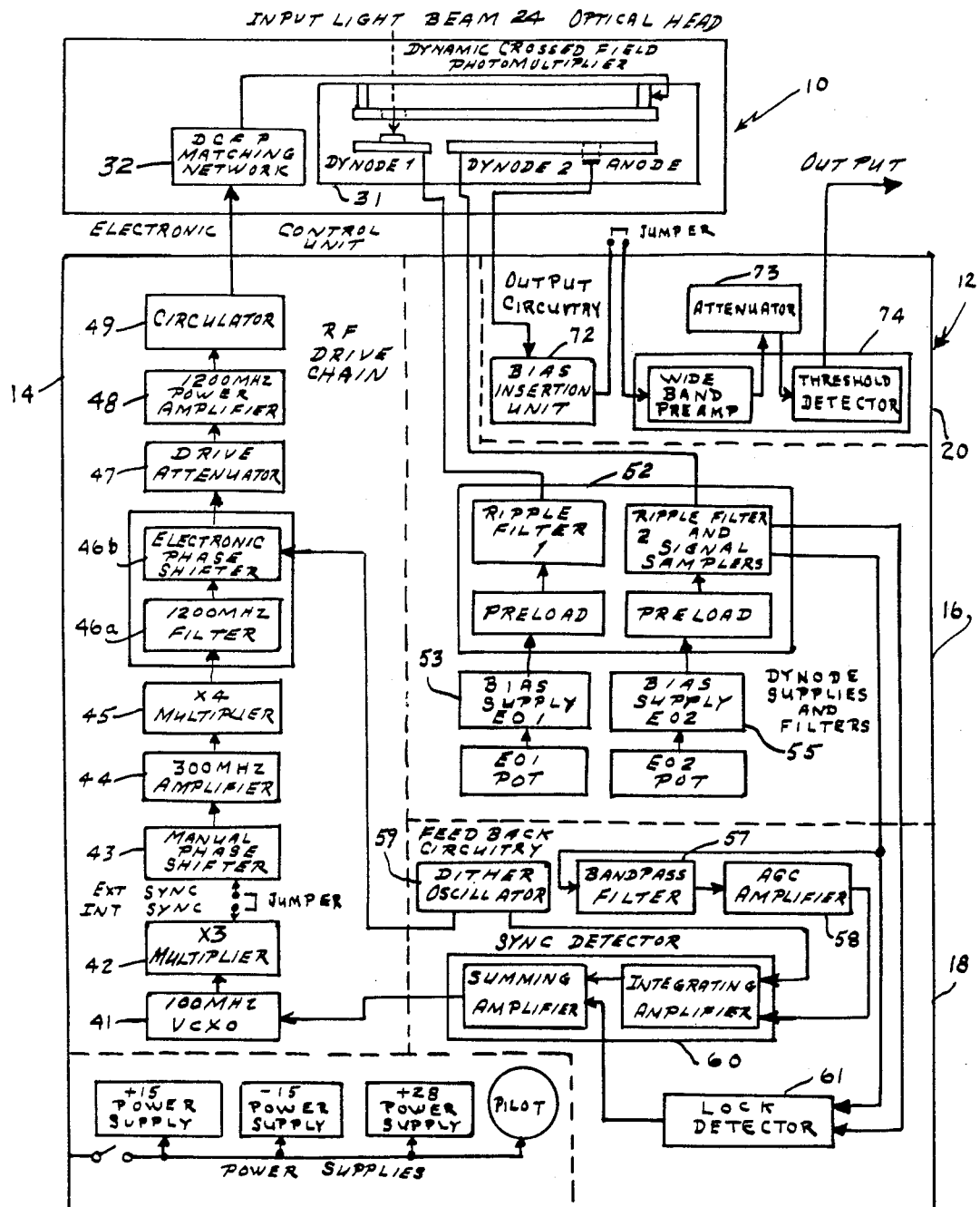

Referring now to the FIGURE, there is shown an optical pulse detector apparatus comprising an optical head 10 and an electronic control unit 12. The electronic control unit 12 further comprises an R. F. drive chain 14, a dynode filter 16, feedback circuitry 18, output circuitry 20 and power supplies 22. The various components of the present invention shall be described in detail beginning with the optical head 10.

The function of the optical head 10 is to convert a pulsed laser light beam 24 into an electrical pulse train with sufficient signal level to drive the post-detection electronics. The signal level to drive the post-detection electronics. The receiver is gated to reject a portion of the extraneous background noise by temporal discrimination. The receiver head is comprised of a dynamic crossed field photomultiplier matching network, a dynamic crossed field photomultiplier, and a cold rolled steel case that serves as a magnetic shield and a flux path for the permanent magnet array that provides the required static magnetic field. The dynamic crossed field photomultiplier 31 is a high speed photomultiplier which is driven by a radio frequency (RF) electric field, dc biasing fields, and a crossed static magnetic field. If offers the advantages of high gain, relatively large photocathode area, and internal subnanosecond gating. The gating recurs at a specific portion of each cycle of the RF drive frequency, so that the dynamic crossed field photomulitplier is particularly useful for receiving regularly recurring optical pulses from a mode-locked laser transmitter.

The detection of pulsed optical inputs is achieved in the dynamic crossed field photomultiplier by sampling the photoelectrons generated at the photocathode at the frequency, or an integral sub-multiple, of the RF driving field. These electron bunches are then multiplied in successive steps by means of secondary emission. The electron bunches are focused in position and time, such that large current gains are achieved without overlap. The dynamic crossed field photomultiplier comprises two parallel metal strip electrodes between which is applied and RF driving electric field and a dc biasing electric field. A 350 to 400 gauss static magnetic field is applied normal to the electric field, and normal to the length of the strips, so that an electron in motion between the strips moves along the direction of the strips. The lower strip has a photocathode near one end, a collecting hole near the other, and is treated to be a good secondary emitting surface. Photoelectrons generated at the photocathode are accelerated towards the top strip, or rail, during the positive half cycle of the RF drive, and the magnetic field will cause them to curve in a cycloidal path towards the collector end of the assembly. On the opposite half cycle, the electrons are returned to the lower strip with sufficient energy so that each electron will generate several secondary electrons. The secondary electron multiplication process is repeated until reaching the collecting hole near the end of the lower strip. After passing through the collecting hole, the multiplied secondary electrons strike the collector, or anode.

Only photoelectrons which are generated during the proper phase of the RF drive cycle will be "sampled"

and amplified by the phase-focusing secondary multiplication sequence; hence, the gating effect of the dynamic crossed field photomultiplier. Photoelectrons generated at other phases of the RF cycle will be collected by the upper electrode which is biased strongly positive or will follow a suboptimal trajectory in which they receive insufficient kinetic energy to generate secondary electrons when reaching the lower electrode. Changing the input pulse arrival time or shape does not result in an equivalent change in output pulse timing or shape. Only the output pulse amplitude changes when the input pulse changes shape or arrival time. The output pulse occurs synchronously with the RF drive to the dynamic crossed field photomultiplier. Since there is no phase change in the dynamic crossed field photomultiplier output for a phase change of the optical input, a dithered gate tracking loop is required to keep the dynamic crossed field photomultiplier gate aligned with the input pulse.

The function of the RF drive chain 14 is to provide a 1200 MHz 1.6 watt, sine wave signal to drive the dynamic crodded field photomultiplier (DCFP) in the optical head 10. The 1200 MHz frequency has a ±0.01 percent automatic adjustment capability to permit synchronization with the optical pulse repetition frequency of the input. The 1200 MHz signal is also phase-dithered at a 1 MHz frequency to permit derivation of phase information in order to provide remote synchronization to the input signal.

The RF drive chain 14 is comprised of a 100 MHz voltage controlled crystal oscillator 41 (VCXO) which serves as the basic source of the RF drive frequency. The VCXO 41 frequency is electronically adjustable by means of a control voltage. The 100 MHz frequency output of the VCXO 41 is multiplied to 300 MHz by a X3 multiplier or tripler 42. Following the tripler 42 is a manual phase shifter 43. If desired, the output of the tripler 42 may be disconnected from the manual phase shifter 43 and an external synchronization signal may be inserted and used to test the dynamic crossed field photomultiplier performance without remote synchronization to demonstrate equivalent performance with and without remote synchronization. The manual phase shifter 43 is then used to adjust the phase of this external synchronization signal. A 300 MHz amplifier 44 increases the signal power level out of the phase shifter to drive the X4 multiplier 45. The 1200 MHz output of the X4 multiplier 45 is filtered by a 1200 MHz bandpass filter 46a. This is used to remove the unwanted sidebands developed by the frequency multiplications. An electronic phase shifter 46b is used to dither the phase of the 1200 MHz signal at a 1 MHz rate. The phase shift of the 1200 MHz signal is approximately 5° peak to peak or a modulation index of 0.05. The phase modulated 1200 MHz passes through a variable attenuator 47, and into a 1200 MHz power amplifier 48, which amplifies the 1200 MHz signal. The current gain of the dynamic crossed field photomultiplier is controlled by varying the RF drive power using the variable attenuator 47 at the input to the power amplifier 48. Between the output of the power amplifier 48 and the dynamic crossed field photomultiplier input is a circulator 49, and a matching network component 32. The circulator 49 is used to protect the power amplifier 48 should the load dynamic crossed field photomultiplier be disconnected. The matching network 32 is used to make the input impedance of the dynamic crossed photomultiplier appear to be 50Ω which is conducive to maximum power transfer.

The function of the dynode filter 16 is to filter the two bias voltages to the two dynamic crossed field photomultiplier dynodes and to sample the second dynode signal current.

The bias filter module 52 reduces the supply ripple and provides samples of the dynode signal to the synchronization and acquisition modules. The ac and average dc currents to the second dynode are sampled. Instead of utilizing part of the available pulse output power of the dynamic crossed field photomultiplier, the required synchronizing information can be derived from observation of the second dynode current. This sampling of the second dynode current is done in the dynode filter module by means of a series current sensing resistor. This dither signal is ac coupled and is used for both tracking and acquisition (lock detector) information. In addition a dc sample or measurement of the second dynode current is also performed in the dynode filter module and this information is also required for proper operation of the lock detector which controls the acquisition process. The bias supplies 53, 55 are dc-dc inverters. Each is capable of supplying 16 mA at 600V dc. The voltages of the bias supplies 53, 55 are preset in the range 300 to 600V dc.

The function of the feedback circuitry 18 is to provide an error voltage to the voltage controlled crystal oscillator 41 to provide control of its oscillation frequency. This error voltage is derived from the product of the output signal sampled at dynode 2 and a reference signal from the dither oscillator 59.

The Feedback Circuitry is comprised of a bandpass filter 57 which is a 5-pole maximally flat (Butterworth) filter. The filter 52 has a 200 kHz bandwidth about a 1 MHz center frequency. The 1 MHz dither frequency passes through the filter suffering only a 4 dB insertion loss while the beatnote frequencies which occur during acquisition are attenuated by more than 50 dB. The beatnote signal is large compared to the dither signal and if not attenuated would set the gain level of the AGC amplifier 58 following the bandpass filter 57, resulting in insufficient amplification of the dither signal. The AGC amplifier 58 following the bandpass filter 57 has a nominal gain of 60dB and is used to maintain the dither signal at a constant level. $K_d$, the phase detector gain, is a function of the dither signal amplitude. With a constant amplitude signal the loop gain remains constant insuring loop stability at large levels of input optical signal. The basic 1 MHz dither frequency is derived from the crystal controlled dither oscillator 59. This oscillator 59 supplies the signal to the electronic phase shifter 41b to phase modulate the RF drive (modulation index ≈ 0.05). In addition, the oscillator 59 supplies reference signal to the sync detector 60 which is used to synchronously demodulate the dither signal. The 1 MHz dither frequency satisfies two criteria. It is large compared to the beatnote frequencies expected during acquisition, and it is less than the lowest signal frequency components expected in the 300 Mbps data. The sync detector 60 contains a double balanced mixer and five operational amplifiers. The mixer compares the amplified and filtered dither signal sampled at the second dynode with the reference signal from the dither oscillator to derive an error voltage proportional to phase error between the dynamic crossed field photomultiplier gate and the optical pulse. The first operational amplifier forms the active filter for the synchronization phase-locked loop. The filter is a lead-lag configuration with a lead time constant of $2.2 \times 10^{-4}$ seconds and a lag time constant of $6.8 \times 10^{-1}$ seconds. The amplifier output is voltage limited to approximately 200 millivolts to limit the magnitude of the error signal when the loop is unlocked. The second amplifier provides additional gain and sums in the sweep generator which is required for acquisition. The third amplifier provides additional gain and is used to limit the voltage excursion to + 1.8 volts which prevents false lock problems and also prevents damage to the VCXO. The total DC gain for the three amplifiers is 630 and with the VCXO gain ($K_o$) of $7.55 \times 10^5$ radians/volt and the phase detector gain ($K_d$) of $5.06 \times 10^{-2}$ volts/radian results in a loop gain of $2.4 \times 10^7$. The phase-locked loop bandwidth is thus 1 kHz with a dampling ratio of 0.66. The fourth amplifier is used to generate the sweep voltage, a triangular waveform 2.8 volts peak to peak and a period of 1 second. The fifth amplifier turns the sweep generator on and off upon command from the lock detector 61. The lock detector 61 measures the AC and DC components of the second dynode current and compares them to decide if the loop is locked or unlocked. When the loop unlocks, the AC component of the dynode current increases substantially due to the presence of the beatnote. This lock detector 61 controls the lock indicator panel light and the acquisition sweep generator.

The use of the output circuitry 20 is optional, however if desired, it will perform signal processing of the dynamic crossed field photomultiplier output signal by amplifying, filtering, and threshold detecting. The output signal is compatible with emitter coupled logic (MECL III) levels. The output circuitry 20 is comprised of the bias insertion unit 72 which provides a dc return path and a means of monitoring anode current. The bias insertion unit attenuator 73 provides an adjustment of the threshold detector 79 input signal level. The threshold detector 74 is comprised of: 1) two commercial ac coupled, wideband preamplifiers, 2) a linearly biased tunnel diode monostable, 3) a common base buffer stage, 4) an ac coupled, wideband postamplifier, and 5) a dc bias network for making the output signal compatible with MECL III logic. A −1.7V level indicates a signal 0, and a −0.8V level indicates a signal 1. The common base buffer is adjusted to amplify the tunnel diode pulse while preventing signal feedthrough when the tunnel diode remains below threshold, thus eliminating pretrigger feedthrough (due to using a one port threshold detector triggering element). The threshold level is also adjustable. The output level is relatively insensitive to the input signal over a wide input range. The threshold detector produces an almost constant amplitude pulse every time the narrow threshold region is exceeded and thereby recovers the binary coding on the input optical pulse train. The function of the power supplies 22 is to supply regulated dc voltages (+15, −15, and +28 to circuits requiring power. In addition, the high voltage bias is generated by the dc-dc converters 53, 55.

The dynamic crossed field photomultiplier samples the input optical pulse train synchronously with the RF drive. The pulse output of the dynamic crossed field photomultiplier is also synchronous with the RF drive. The magnitude of the dynamic crossed field photomultiplier output is proportional to the signal present when the gating is on (which arises due to the internal sampling over a portion of each RF drive cycle). The RF drive signal to the dynamic crossed field photomultiplier is phase modulated or phase dithered a deterministic amount at the dither frequency. When the RF drive frequency and the pulse repetition frequency are the same, the dynamic crossed field photomultiplier time of sampling or gating dithers with respect to the optical pulse in exactly the same manner in which the RF drive phase is dithered. The convolution of the optical pulse with the internal dithered dynamic crossed field photomultiplier gate results in dynamic crossed field photomultiplier output pulses being amplitude and phase modulated at the either frequencies. These amplitude and phase modulations on the dynamic crossed field photomultiplier output are synchronously detected by using the dither oscillator as a reference.

This detected signal forms the phase-locked loop error signal. This error signal is then filtered and amplified and used to drive the VCXO which determines the RF drive phase and frequency. Besides this tracking mode of operation, an acquisition mode exists in which the RF drive frequency is swept until it is close (within the loop bandwidth) to the optical pulse repetition frequency. This acquisition mode has a lock detector to determine if the RF drive frequency is close to the optical pulse repetition frequency and a switchable sweep generator to sweep the RF drive frequency via the VCXO.

Although the invention has been described with reference to a particular embodiment, it will be understood to those skilled in the art that the invention is capable of a variety of alternative embodiments within the spirit and scope of the appended claims.

We claim:

1. An optical pulse detector apparatus comprising in combination:
   an optical head unit to receive a pulsed laser light beam, said optical head unit converting said pulsed laser light beam into an electrical pulse train signal, and,
   an electronic control unit comprising in combination:

an R. F. drive chain to provide a 1200 MHz sine wave signal to drive said optical head unit,
   a dynode filter unit to bias and filter the bias voltage to said optical head unit and to sample said electrical pulse train signal,
   a feedback unit to receive said sampled pulse train signal from said dynode filter unit and to provide an error voltage to said R. F. drive chain, said error voltage controlling the oscillation frequency of said R. F. drive chain, said error voltage controlling the oscillation frequency of said R. F. drive chain, said feedback unit containing a dither oscillator to provide a 1 MHz dither frequency to phase dither said 1200 MHz sine wave signal, said 1200 MHz signal, being thus dithered, containing phase information to provide remote synchronization to said optical head unit, and
   a power supply unit to provide power to said electronic control unit.

2. An optical pulse detector apparatus as described in claim 1 further including an output circuit comprising in combination:

a bias insertion unit connected to said optical head unit to monitor said pulse train signal, a threshold detector unit to receive said pulse train signal from said bias insertion unit, said threshold detector unit determining the input level of said pulse train signal, said threshold detector unit comparing said input level with a predetermined reference and providing a logic output signal in response to the comparison of said input level, and an attenuator unit connected to said threshold detector unit to provide an adjustment of said threshold detector input signal level.

3. An optical pulse detector apparatus as described in claim 1 wherein said feedback unit comprises in combination:

a bandpass filter to receive said sampled pulse train signal from said dynode filter unit, said bandpass filter filtering said sampled pulse train signal and providing a filtered output signal, an AGC amplifier to receive said filtered output signal, said AGC amplifier maintaining said filtered output signal at a constant level, said AGC amplifier providing a constant level output signal, a dither oscillator to provide a 1 MHz dither frequency to said RF drive chain, said dither oscillator providing a reference signal, and a syne detector unit receiving said reference signal and said constant level output signal, said sync detector unit comparing said reference signal and said constant level output signal to provide an error signal to said RF drive chain.

* * * * *